(12) United States Patent
Park et al.

(10) Patent No.: US 6,745,670 B2
(45) Date of Patent: Jun. 8, 2004

(54) BREAD MAKER

(75) Inventors: Jae-ryong Park, Suwon (KR); Jong-wook Lee, Yongin (KR); Tae-uk Lee, Suwon (KR); Han-jun Sung, Suwon (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 0 days.

(21) Appl. No.: 10/458,658

(22) Filed: Jun. 11, 2003

(65) Prior Publication Data

US 2004/0011214 A1 Jan. 22, 2004

(30) Foreign Application Priority Data

Jul. 20, 2002 (KR) ......................................... 2002-42767

(51) Int. Cl.[7] .............................. A23L 1/00; A47J 27/62; A47J 37/01; A21C 1/08
(52) U.S. Cl. ............................... 99/348; 99/353; 99/426
(58) Field of Search ........................... 99/325–331, 341, 99/342, 348, 343, 352–355, 426, 449; 366/69, 130, 143, 145, 146, 149, 219, 240, 341, 349, 602; 222/94, 98, 100–102; 206/219, 221; 383/38; 426/128, 232, 233, 392, 394, 87, 112, 405, 113, 120, 124, 512, 523

(56) References Cited

U.S. PATENT DOCUMENTS

| | | | |
|---|---|---|---|
| 4,550,653 A | | 11/1985 | Hedenberg |
| 4,550,654 A | * | 11/1985 | Hedenberg ................... 99/348 |
| 4,590,850 A | * | 5/1986 | Hedenberg ................... 99/348 |
| 4,803,086 A | * | 2/1989 | Hedenberg ................... 426/87 |
| 5,146,840 A | * | 9/1992 | Hedenberg ................... 99/328 |
| 5,947,009 A | * | 9/1999 | Hedenberg ................... 99/348 |

FOREIGN PATENT DOCUMENTS

| | | |
|---|---|---|
| JP | 1-300912 | 12/1989 |
| JP | 2-61424 | 3/1990 |
| JP | 2-140518 | 5/1990 |
| JP | 6-327565 | 11/1994 |
| JP | 11-346930 | 12/1999 |
| KR | 1992-1841 | 2/1992 |
| KR | 1992-7412 | 5/1992 |
| KR | 1992-7541 | 5/1992 |
| KR | 2002-53646 | 7/2002 |
| WO | WO 86/03931 | 7/1986 |
| WO | WO 87/03784 | 7/1987 |
| WO | WO 92/10100 | 9/1992 |
| WO | WO 99/25467 | 5/1999 |

OTHER PUBLICATIONS

EPO Search Report for corresponding Application No. EP 02258695 dated Nov. 10,2003.

* cited by examiner

Primary Examiner—Timothy F. Simone
(74) Attorney, Agent, or Firm—Staas & Halsey LLP (57) ABSTRACT

A bread maker having an oven compartment, a door opening and closing the oven compartment, a fixed kneader with a first kneading roller, and a rotatable kneader with a second kneading roller. The rotatable roller rotates between a kneading position at which the first kneading roller and the second kneading roller face each other, and a released position at which the second kneading roller is spaced apart from the first kneading roller. A spring has a first end attached to a side wall of the oven compartment and a second end coupled to the rotatable kneader, and elastically returns the rotatable kneader to the kneading position as the door is closed and elastically maintains the rotatable kneader at the released position when the door is opened. A pusher in the door pushes the rotatable kneader from the released position to the kneading position as the door is closed.

27 Claims, 6 Drawing Sheets

BREAD MAKER

CROSS-REFERENCE TO RELATED APPLICATIONS

This application claims the benefit of Korean Application No. 2002-42767, filed Jul. 20, 2002, in the Korean Intellectual Property Office, the disclosure of which is incorporated herein by reference.

BACKGROUND OF THE INVENTION

1. Field of the Invention

The present invention relates to a bread maker, and more particularly, to a bread maker that automatically returns a rotatable kneader to a kneading position when the door of the bread maker is closed.

2. Description of the Related Art

Figure 5:
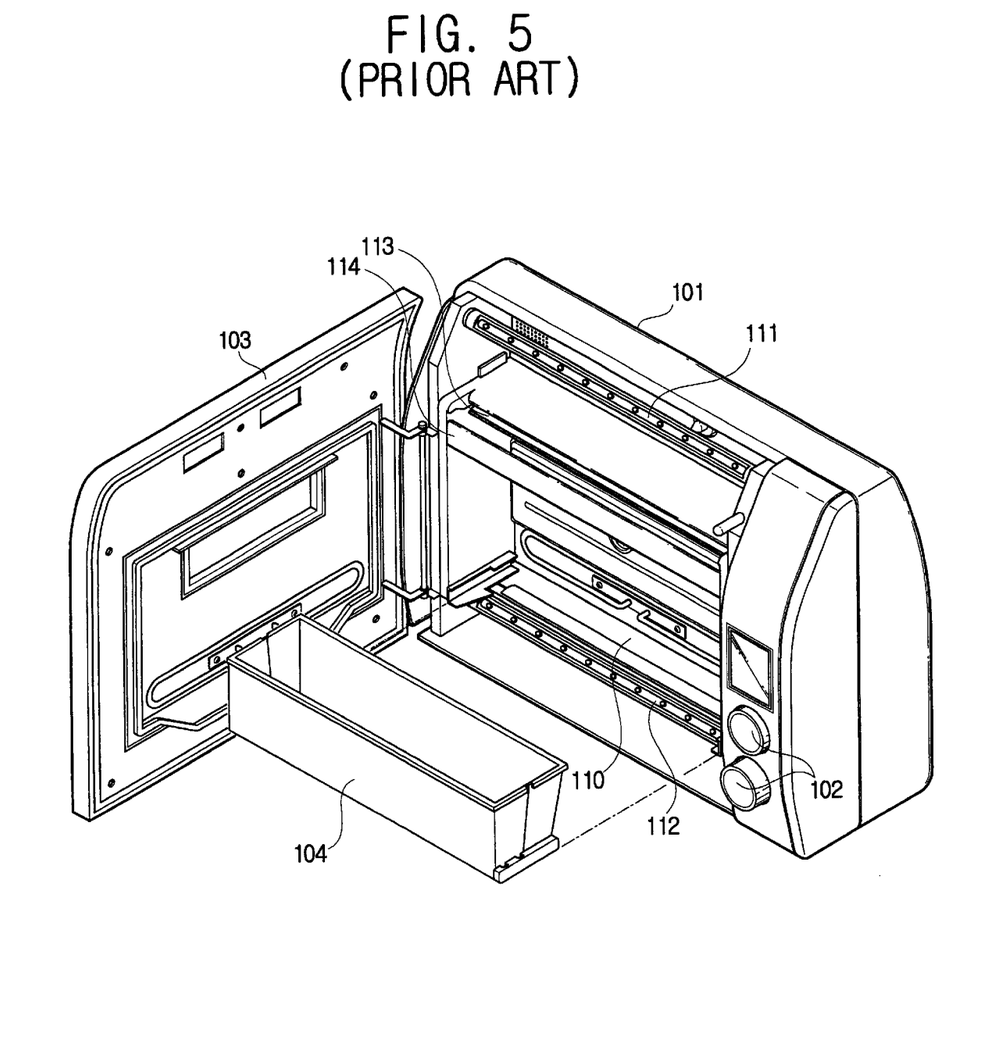
FIG. 5 is a perspective view of a conventional bread maker.

As shown in FIG. 5, a bread maker disclosed in Korean Patent Application No. 2000-83355 includes a main body 101 forming an oven compartment 110, a door 103 opening and closing the oven compartment 110, and a control panel 102 provided in a front side of the main body 101 allowing a user to control the bread maker.

Inside the oven compartment 110, upper and lower kneading drums 111 and 112 are rotatably provided in parallel, on which opposite ends of a mixing bag (not shown) filled with raw materials (ingredients) for bread are attached and wound in clockwise and counterclockwise directions. At a lower inside portion of the oven compartment 110, between the upper and lower kneading drums 111 and 112, is a baking tray 104 that is capable of being withdrawn outside the bread maker and contains kneaded dough therein.

Between the upper kneading drum 111 and the baking tray 104 are a fixed kneader 113 and a rotatable kneader 114 forming a pair. The fixed and rotatable kneaders 113 and 114 knead the dough in the mixing bag and prevent the dough from moving to the upper kneading drum 111. The fixed kneader 113 has a first kneading roller along a lengthwise direction thereof, which faces the rotatable kneader 114 and contacts the mixing bag. The rotatable kneader 114 has a second kneading roller along a lengthwise direction thereof, which faces the fixed kneader 113 and contacts the mixing bag.

In the conventional bread maker, when the mixing bag is to be installed on the upper kneading drum 111, the second kneading roller of the rotatable kneader 114 is first rotated downwards to leave a space between the fixed kneader 113 and the rotatable kneader 114. Thereafter, the mixing bag is attached to the upper kneading drum 111, and the rotatable kneader 114 is returned to its initial position, (i.e., a kneading position). If the dough is kneaded with the rotatable kneader 114 not in the kneading position, the dough in the mixing bag is not successfully kneaded and also moves to the upper kneading drum 111. However, a user is likely to carelessly forget to return the rotatable kneader 114 to the kneading position.

SUMMARY OF THE INVENTION

It is an object of the present invention to provide a bread maker in which a rotatable kneader is automatically returned to a kneading position when the door of the bread maker is closed.

Additional objects and advantages of the invention will be set forth in part in the description that follows, and, in part, will be obvious from the description, or may be learned by practice of the invention.

To achieve the above and other objects according to an embodiment of the present invention, there is provided a bread maker having a main body forming an oven compartment, a door opening and closing the oven compartment, a fixed kneader in the oven compartment with a first kneading roller contacting a mixing bag, and a rotatable kneader in the oven compartment with a second kneading roller, the rotatable roller rotating between a kneading position at which the first kneading roller and the second kneading roller face each other with the mixing bag therebetween, and a released position at which the second kneading roller is spaced apart from the first kneading roller. A spring has a first end attached to a side wall of the oven compartment and a second end coupled to the rotatable kneader, and elastically returns the rotatable kneader to the kneading position as the door is closed and elastically maintains the rotatable kneader at the released position when the door is opened; and a pusher on an inside surface of the door pushes the rotatable kneader from the released position to the kneading position as the door is closed.

The bread maker further includes a rotatable arm connecting the spring and the rotatable kneader.

To achieve the above and other objects according to another aspect of the present invention, there is provided a kneader for a bread maker having a main body forming an oven compartment and a door opening and closing the oven compartment. The kneader includes a fixed kneader in the oven compartment having a first kneading roller; a rotatable kneader in the oven compartment having a second kneading roller and being rotatable between a kneading position and a released position, the kneading position being a position at which the first kneading roller and the second kneading roller face one another to knead a mixing bag filled with bread ingredients placed therebetween, and the released position being a position at which the second kneading roller is spaced apart from the first kneading roller; and an elastic member having a first end attached to a side wall of the oven compartment and a second end attached to the rotatable kneader, and elastically maintaining the rotatable kneader at the released position when the door is opened and the rotatable kneader is rotated away from the fixed kneader, and elastically returning the rotatable kneader to the kneading position as the door is closed.

To achieve the above and other objects according to another aspect of the present invention, there is provided a kneading assembly for a bread maker having a main body forming an oven compartment and a door opening and closing the oven compartment. The kneading assembly includes a fixed kneader in the oven compartment; a rotatable kneader in the oven compartment adjacent the fixed kneader and being rotatable between a kneading position and a released position, the kneading position being a position at which the rotatable kneader and the fixed kneader face one another to knead a mixing bag filled with bread ingredients placed therebetween, and the released position being a position at which the rotatable kneader is rotated away from the fixed kneader; a pusher on an inside surface of the door to push the rotatable kneader from the released position when the door is opened to the kneading position as the door is closed; and an elastic member having a first end attached to a side wall of the oven compartment and a second end attached to the rotatable kneader, the elastic member elastically maintaining the rotatable kneader at the released position when the door is opened and the rotatable kneader is rotated away from the fixed kneader, and elastically returning the rotatable kneader to the kneading position as the door is closed and the pusher pushes the rotatable kneader to the kneading position.

These together with other aspects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and other objects and advantages of the present invention will become apparent and more readily appreciated from the following description of the embodiments, taken in conjunction with the accompany drawings, of which.

DETAILED DESCRIPTION OF THE PREFERRED EMBODIMENT

Hereinafter, embodiments of the present invention will be described in detail with reference to the attached drawings, wherein the like reference numerals refer to the like elements throughout. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

Figure 1:
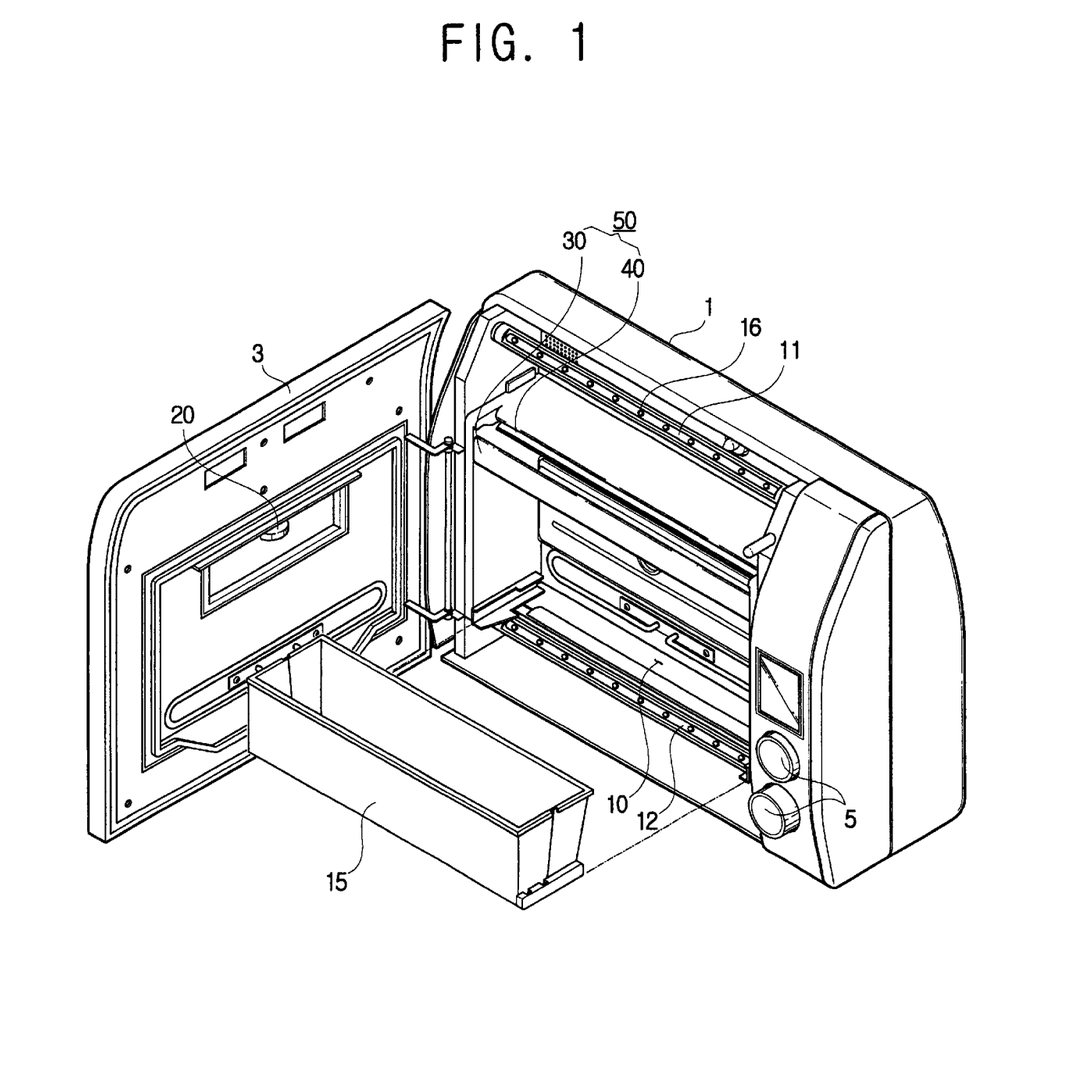
FIG. 1 is a perspective view illustrating a bread maker according to an embodiment of the present invention.

FIG. 1 is a perspective view illustrating a bread maker according to an embodiment of the present invention. As shown therein, a bread maker according to the present invention includes a main body 1 forming an oven compartment 10 and an electric component compartment (not shown), a door 3 in the front of the main body 1 to open and close the oven compartment 10, and a control panel 5 in a front side of the main body 1 allowing a user to control the bread maker.

Figure 6:
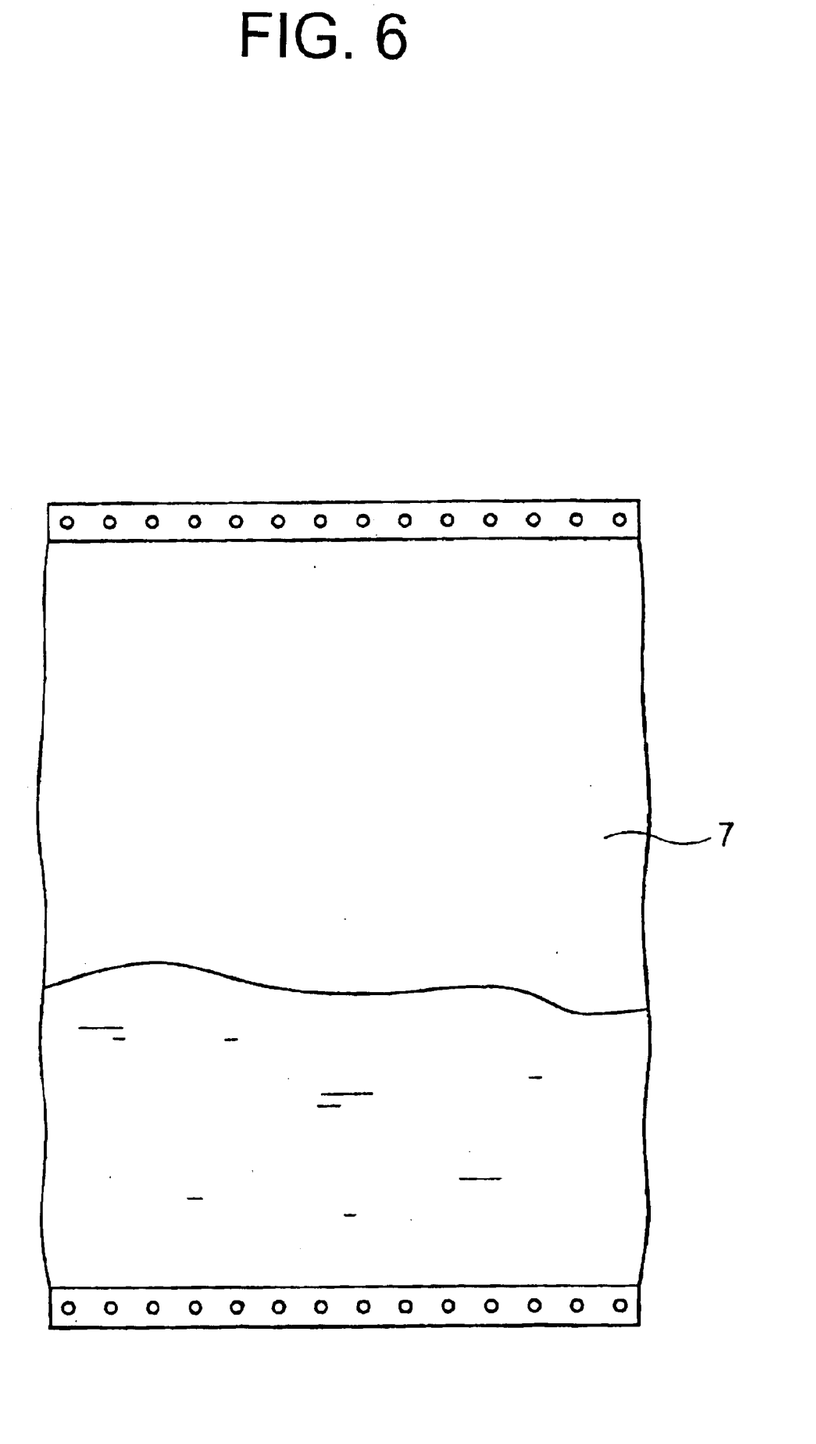
FIG. 6 is a perspective view of a mixing bag used in the bread maker according to the embodiment of the present invention.

Inside the oven compartment 10, upper and lower kneading drums 11 and 12 are rotatably provided in parallel, on which opposite ends of a mixing bag 7 (see FIG. 6) filled with raw materials for the bread are attached and wound. At a lower inside portion of the oven compartment 10, between the upper and lower kneading drums 11 and 12, is a baking tray 15 in which kneaded dough is contained. Inside the electric component compartment is a drum driving part (not shown) rotating the upper and lower kneading drums 11 and 12 in clockwise and counterclockwise directions.

At an upper inside portion of the oven compartment 10, between the upper kneading drum 11 and the baking tray 15, is a kneader 50.

The kneader 50 includes a fixed kneader 40 and a rotatable kneader 30 forming a pair. The fixed and rotatable kneaders 40 and 30 knead the dough in the mixing bag 7 and prevent the dough from moving beyond the inside of the baking tray 15 to the upper kneading drum 111.

The door 3 has a pusher 20 on the inside surface thereof. The pusher 20 pushes the rotatable kneader 30 as the door 3 is closed, thereby returning the rotatable kneader 30 from a downward rotated position (i.e., from a released position) to a kneading position.

Figure 2:
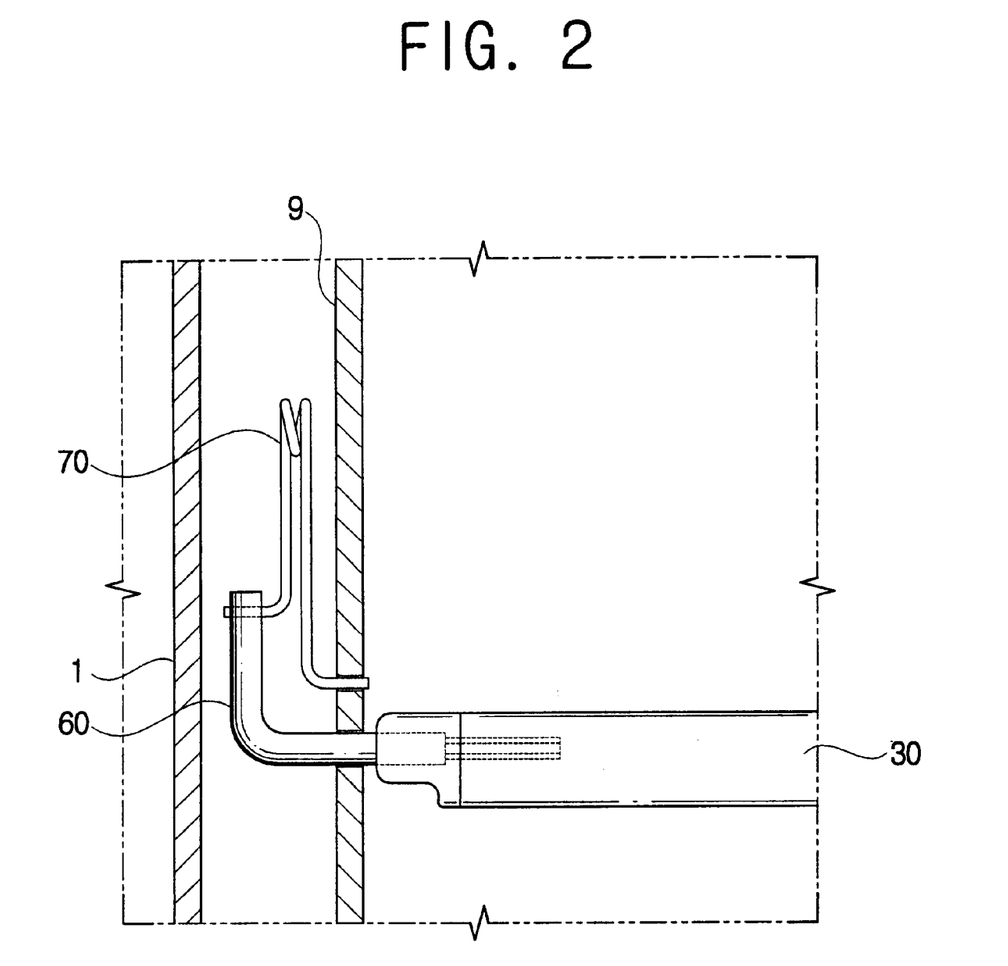
FIG. 2 is a partial sectional view illustrating a combination of a rotatable kneader, a rotatable arm, and a spring in the bread maker shown in FIG. 1.
Figure 3:
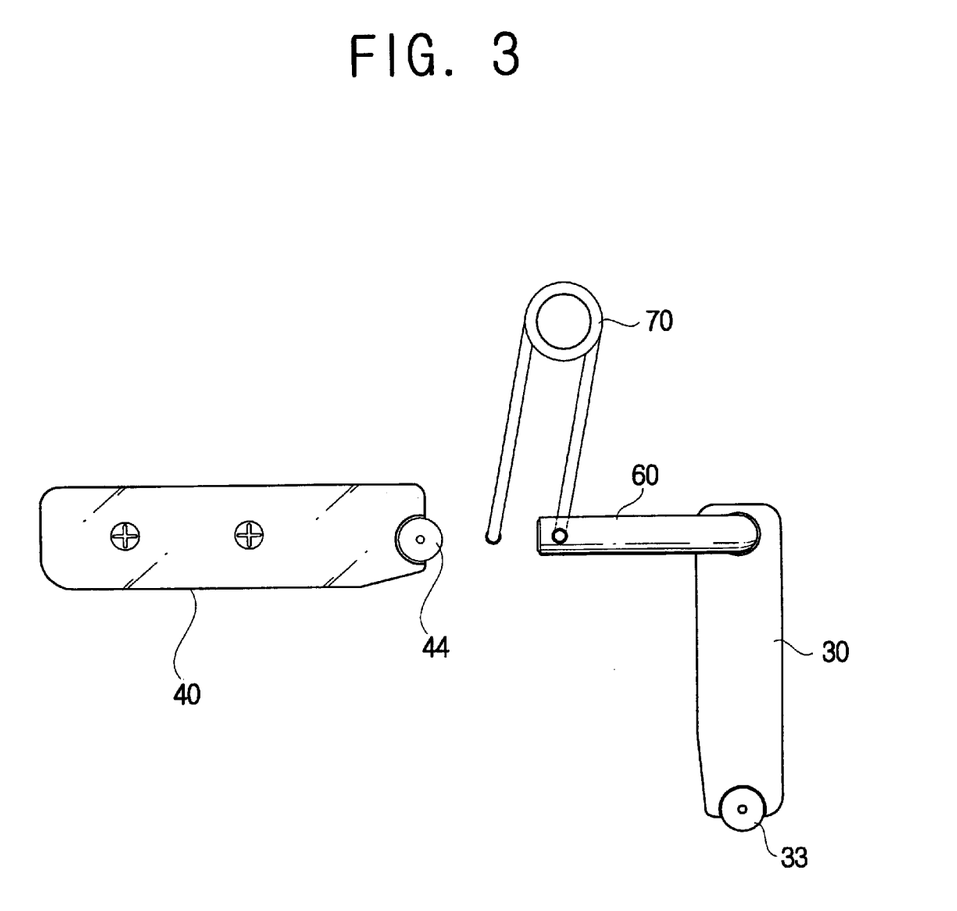
FIGS. 3 and 4 illustrate operations of the rotatable kneader of FIG. 2.
Figure 4:
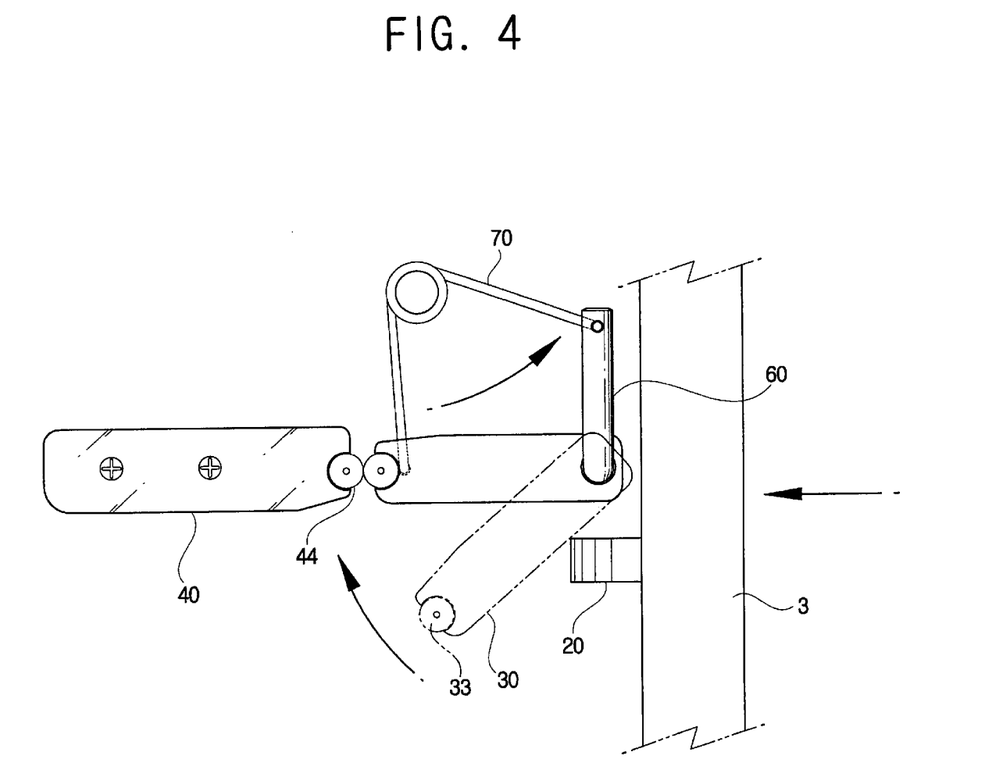

As shown in FIGS. 2 through 4, the fixed kneader 40 is attached to a side wall 9 of the oven compartment 10 and has a first kneading roller 44 along a lengthwise direction thereof, which faces the rotatable kneader 30 and contacts the mixing bag 7. The rotatable kneader 30 is attached to the side wall 9 of the oven compartment 10 and has a second kneading roller 33 along a lengthwise direction thereof, which faces the fixed kneader 40 (FIG. 4) and contacts the mixing bag 7. Hence, the rotatable and fixed kneaders 30 and 40 form a slit (not shown) through which the mixing bag 7 passes.

At an area in which the rotatable kneader 30 is attached to the side wall 9 of the oven compartment 10, there are a rotatable arm 60 extended and bent from one end of the rotatable kneader 30, and a spring 70 elastically rotating the rotatable kneader 30 to its kneading position.

The rotatable arm 60 has a first end part connected to one end of the rotatable kneader 30 that passes through the side wall 9 of the oven compartment 10, and a second end part extended from the first end part and coupled to the spring 70, which is connected to the side wall 9 of the oven compartment 10.

The spring 70 is a toggle spring, and has a first end part coupled to the side wall 9 of the oven compartment 10 and a second end part coupled to the rotatable arm 60. The spring 70 elastically returns the rotatable kneader 30, which moves as the mixing bag 7 moves, to the kneading position when the door 3 is closed and elastically maintains the rotatable kneader 30 at the released position when the door 3 is opened.

The pusher 20 on the inside surface of the door 3 pushes the rotatable kneader 30 when the door 3 is closed, thereby returning the rotatable kneader 30 from a downward rotated position to the kneading position. The pusher 20 pushes only enough for the rotatable kneader 30 to be elastically returned to the kneading position by the spring 70. Thus, the user does not need to return the rotatable kneader 30 to the kneading position.

The pusher 20 may be made of a metal or heat-resistant plastic materials and has a size sufficient to return the rotatable kneader 30 to the kneading position without damaging the mixing bag 7 when the door 3 is closed.

Thus, the rotatable kneader 30 is automatically returned to the kneading position by the pusher 20 on the inside surface of the door 3, thereby preventing the dough from being kneaded when the rotatable kneader 30 has not been returned to the kneading position.

As described above, the embodiment of the present invention provides a bread maker with a pusher on the inside surface of a door, so that a rotatable kneader is automatically returned to a kneading position when the door is closed.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A bread maker having a main body forming an oven compartment, a door opening and closing the oven compartment, a fixed kneader in the oven compartment with a first kneading roller contacting a mixing bag, and a rotatable kneader in the oven compartment with a second kneading roller, the rotatable roller rotating between a kneading position at which the first kneading roller and the second kneading roller face each other with the mixing bag therebetween, and a released position at which the second kneading roller is spaced apart from the first kneading roller, the bread maker comprising:

a spring having a first end attached to a side wall of the oven compartment and a second end coupled to the rotatable kneader, and elastically returning the rotatable kneader to the kneading position as the door is closed and elastically maintaining the rotatable kneader at the released position when the door is opened; and a pusher on an inside surface of the door, pushing the rotatable kneader from the released position to the kneading position as the door is closed.

2. The bread maker according to claim 1, further comprising a rotatable arm connecting the spring and the rotatable kneader.

3. The bread maker according to claim 1, wherein the first kneading roller extends lengthwise along the fixed kneader and the second kneading roller extends lengthwise along the rotatable kneader.

4. The bread maker according to claim 1, wherein the pusher is made of a metal or a heat-resistant plastic and has a size sufficient to automatically return the rotatable kneader to the kneading position without damaging the mixing bag when the door is closed.

5. The bread maker according to claim 2, wherein the spring is between the side wall and the main body and the rotatable arm extends from the rotatable kneader through the side wall of the oven compartment and is bent between an end connected to the spring and an end extending through the side wall.

6. The bread maker according to claim 1, further comprising an upper kneading drum and a lower kneading drum on which opposite ends of the mixing bag are attached and wound as the upper kneading drum and the lower kneading drum rotate in clockwise and counterclockwise directions.

7. The bread maker according to claim 6, wherein the fixed kneader and the rotatable kneader knead dough in the mixing bag and prevent the dough from moving outside a baking tray toward the upper kneading drum.

8. The bread maker according to claim 6, wherein the mixing bag is kneaded by the fixed kneader and the rotatable kneader when the rotatable kneader is in the kneading position as the mixing bag is wound and unwound on the upper kneading drum and the lower kneading drum.

9. A kneader for a bread maker having a main body forming an oven compartment and a door opening and closing the oven compartment, the kneader comprising:

a fixed kneader in the oven compartment having a first kneading roller;

a rotatable kneader in the oven compartment having a second kneading roller and being rotatable between a kneading position and a released position, the kneading position being a position at which the first kneading roller and the second kneading roller face one another to knead a mixing bag filled with bread ingredients placed therebetween, and the released position being a position at which the second kneading roller is spaced apart from the first kneading roller; and an elastic member having a first end attached to a side wall of the oven compartment and a second end attached to the rotatable kneader, and elastically maintaining the rotatable kneader at the released position when the door is opened and the rotatable kneader is rotated away from the fixed kneader, and elastically returning the rotatable kneader to the kneading position as the door is closed.

10. The kneader according to claim 9, further comprising a rotatable arm connecting the elastic member and the rotatable kneader.

11. The kneader according to claim 9, wherein the first kneading roller extends lengthwise along the fixed kneader and the second kneading roller extends lengthwise along the rotatable kneader.

12. The kneader according to claim 9, wherein the elastic member is a toggle spring.

13. The kneader according to claim 9, wherein a pusher in an inner surface of the door pushes the rotatable kneader from the released position to the kneading position as the door is closed.

14. The kneader according to claim 13, wherein the pusher is made of a metal or a heat-resistant plastic and has a size sufficient to automatically return the rotatable kneader to the kneading position without damaging the mixing bag when the door is closed.

15. The kneader according to claim 10, wherein the elastic member is between the side wall and the main body and the rotatable arm extends from the rotatable kneader through the side wall of the oven compartment and is bent between an end connected to the elastic member and an end extending through the side wall.

16. The kneader according to claim 9, wherein the bread maker has an upper kneading drum and a lower kneading drum on which opposite ends of the mixing bag are attached and wound as the upper kneading drum and the lower kneading drum rotate in clockwise and counterclockwise directions.

17. The kneader according to claim 16, wherein the fixed kneader and the rotatable kneader knead dough in the mixing bag and prevent the dough from moving outside a baking tray toward the upper kneading drum.

18. The kneader according to claim 16, wherein the mixing bag is kneaded by the fixed kneader and the rotatable kneader when the rotatable kneader is in the kneading position as the mixing bag is wound and unwound on the upper kneading drum and the lower kneading drum.

19. A kneading assembly for a bread maker having a main body forming an oven compartment and a door opening and closing the oven compartment, the kneading assembly comprising:

a fixed kneader in the oven compartment;

a rotatable kneader in the oven compartment adjacent the fixed kneader and being rotatable between a kneading position and a released position, the kneading position being a position at which the rotatable kneader and the fixed kneader face one another to knead a mixing bag filled with bread ingredients placed therebetween, and the released position being a position at which the rotatable kneader is rotated away from the fixed kneader;

a pusher on an inside surface of the door to push the rotatable kneader from the released position when the door is opened to the kneading position as the door is closed; and an elastic member having a first end attached to a side wall of the oven compartment and a second end attached to the rotatable kneader, the elastic member elastically maintaining the rotatable kneader at the released position when the door is opened and the rotatable kneader is rotated away from the fixed kneader, and elastically returning the rotatable kneader to the kneading position as the door is closed and the pusher pushes the rotatable kneader to the kneading position.

20. The kneading assembly according to claim 19, further comprising a rotatable arm connecting the elastic member and the rotatable kneader.

21. The kneading assembly according to claim 19, wherein the first kneading roller extends lengthwise along the fixed kneader and the second kneading roller extends lengthwise along the rotatable kneader.

22. The kneading assembly according to claim 19, wherein the elastic member is a toggle spring.

23. The kneading assembly according to claim 19, wherein the pusher is made of a metal or a heat-resistant plastic and has a size sufficient to automatically return the rotatable kneader to the kneading position without damaging the mixing bag when the door is closed.

24. The kneading assembly according to claim 20, wherein the elastic member is between the side wall and the main body and the rotatable arm extends from the rotatable kneader through the side wall of the oven compartment and is bent between an end connected to the elastic member and an end extending through the side wall.

25. The kneading assembly according to claim 19, wherein the bread maker has an upper kneading drum and a lower kneading drum on which opposite ends of the mixing bag are attached and wound as the upper kneading drum and the lower kneading drum rotate in clockwise and counter-clockwise directions.

26. The kneading assembly according to claim 25, wherein the fixed kneader and the rotatable kneader knead dough in the mixing bag and prevent the dough from moving outside a baking tray toward the upper kneading drum.

27. The kneading assembly according to claim 25, wherein the mixing bag is kneaded by the fixed kneader and the rotatable kneader when the rotatable kneader is in the kneading position as the mixing bag is wound and unwound on the upper kneading drum and the lower kneading drum.

* * * * *